United States Patent [19]

Hara et al.

[11] Patent Number: 4,749,912

[45] Date of Patent: Jun. 7, 1988

[54] ION-PRODUCING APPARATUS

[75] Inventors: Tamio Hara, Tokyo; Manabu Hamagaki, Wako; Yoshinobu Aoyagi, Saitama; Susumu Namba, Tokyo; Nobuo Ishii; Naoki Takayama, both of Kofu; Kohei Kawamura, Nirasaki, all of Japan

[73] Assignees: Rikagaku Kenkyusho, Wako; Tokyo Electron Limited, Tokyo, both of Japan

[21] Appl. No.: 54,496

[22] Filed: May 27, 1987

[30] Foreign Application Priority Data

| | | | |
|---|---|---|---|
| May 27, 1986 | [JP] | Japan | 61-121967 |
| Jan. 31, 1987 | [JP] | Japan | 62-21302 |
| Jan. 31, 1987 | [JP] | Japan | 62-21303 |
| Jan. 31, 1987 | [JP] | Japan | 62-21304 |
| Mar. 9, 1987 | [JP] | Japan | 62-53391 |

[51] Int. Cl.[4] .......................... G01T 1/20; H01J 27/00

[52] U.S. Cl. ............................... 315/111.81; 313/230; 313/231.41; 313/359.1; 313/360.1; 313/362.1; 313/161; 250/423 R; 250/427; 315/111.31

[58] Field of Search ................... 250/423 R, 425, 427; 315/111.81, 111.01, 111.51, 111.41, 111.91; 313/359.1, 362.1, 231.31, 231.41, 231.51, 230, 161, 298, 299, 301

[56] References Cited

U.S. PATENT DOCUMENTS

| | | | |
|---|---|---|---|
| 3,924,134 | 12/1975 | Uman et al. | 250/423 R |
| 4,691,109 | 9/1987 | Magee et al. | 315/111.81 X |

OTHER PUBLICATIONS

"Preprint of 46th Applied Physics Institute" (Gakkai), 1985.

"Research Report–Institute of Plasma Physics Nogoya University", Electron Temperature Effects for an Ion Beam Source, Joshin Uramoto, 5/79.

*Primary Examiner*—David K. Moore
*Assistant Examiner*—Mark R. Powell
*Attorney, Agent, or Firm*—Oblon, Fisher, Spivak, McClelland & Maier

[57] ABSTRACT

An ion-producing apparatus comprises an electron-producing vessel having an electron-producing chamber, an ion-producing vessel having an ion-producing chamber communicating with the electron-producing chamber, a cathode provided at one end of the electron-producing vessel, an accelerating electrode provided within the ion-producing chamber, for allowing passage of electrons, an anode provided between the cathode and the accelerating electrode, and a power supply circuit for providing a potential difference between the cathode and the anode, thereby to produce electrons in the gap between the cathode and the anode. A vacuum pump is provided for evacuating gas from the ion-producing chamber. A partition is provided within the electron-producing vessel, between the cathode and the anode to divide the electron-producing vessel into a cathode-side chamber and an anode-side chamber, and hinders a gas flow from the cathode-side chamber to the anode-side chamber to apply a pressure difference between both chambers.

13 Claims, 2 Drawing Sheets

ION-PRODUCING APPARATUS

BACKGROUND OF THE INVENTION

The present invention relates to an ion-producing apparatus for producing ions by applying an electron beam, and for emitting the ions thus produced.

An ion-producing apparatus of this type comprises a plasma-producing region, an accelerating cathode, an electron beam-accelerating region, an accelerating anode, and an ion-producing region, which are arranged in a line in this order. The apparatus further comprises a means for applying a potential to the target cathode, which is negative with respect to the potential of the accelerating anode, and an ion-extracting electrode for extracting cations or anions produced in the ion-producing region. In this apparatus, the accelerating anode attracts electrons from the plasma-producing region, which then rush into the ion-producing region, where they collide with the molecules of the inert gas (or the atoms of the metal vapor) present in the ion-producing region, thereby producing ions. These ions rush back to the accelerating cathode, and electrically neutralize the negative potential barrier formed in the vicinity of the outlet of the accelerating cathode. As a result, an electron beam having a large current, proportionate to the density of the plasma produced in the plasma-producing region, is applied to the ion-producing region. Hence, ions, the number of which is in proportion to the current value of the electron beam, are produced in the ion-producing region. These ions are attracted to the ion-extracting electrode, and are then emitted from the ion-producing region.

The apparatus described above is, however, rather complex in structure, is comparatively large, and cannot emit ions efficiently.

SUMMARY OF THE INVENTION

It is accordingly the object of the present invention to provide an ion-producing apparatus which is small and simple in structure, and can emit ions with high efficiency.

DETAILED DESCRIPTION OF THE PREFERRED EMBODIMENT

An ion-producing apparatus according to an embodiment of the present invention will now be described, with reference to the drawings attached hereto.

Figure 1:
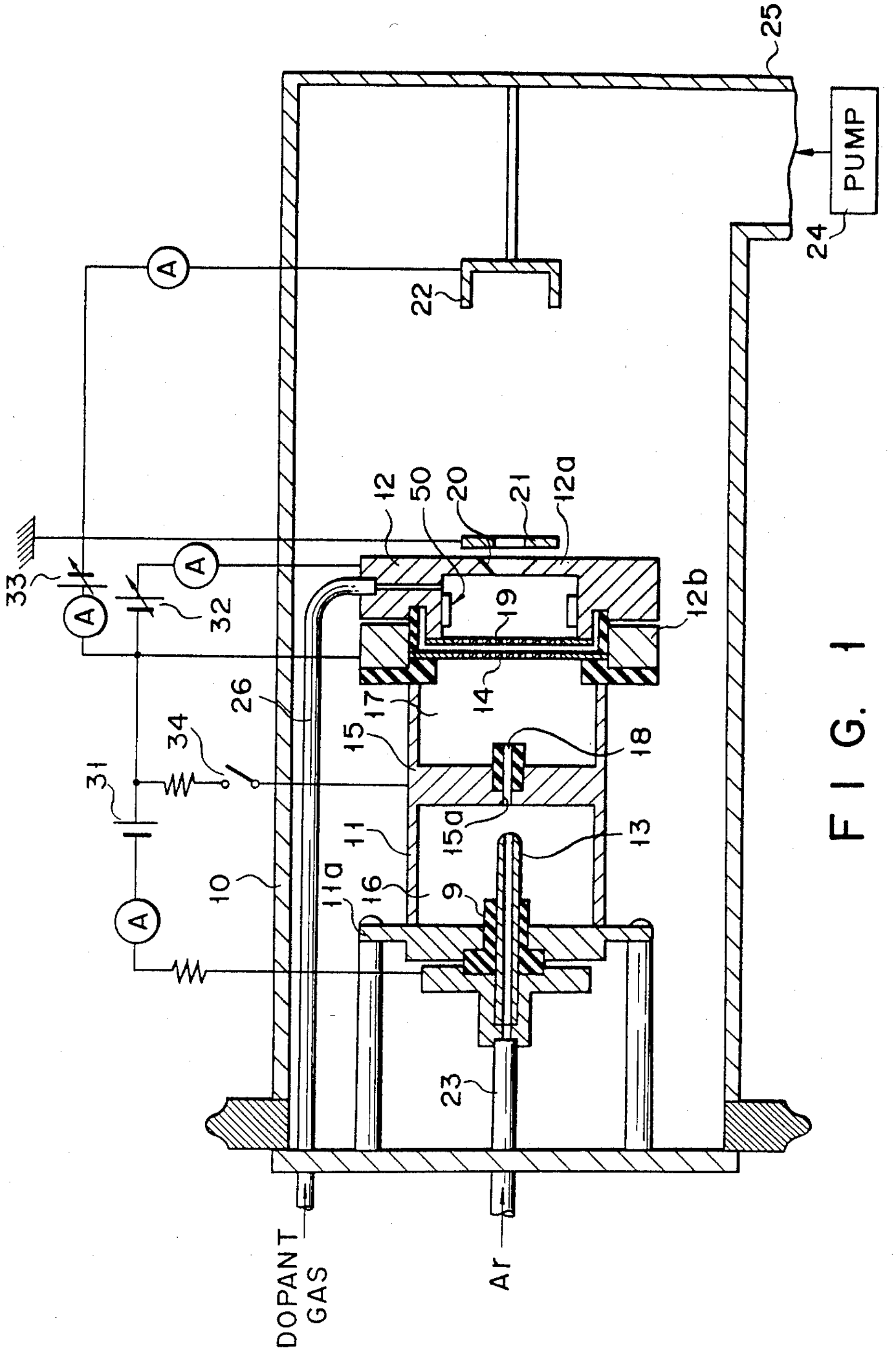
FIG. 1 is a cross-sectional view schematically illustrating an ion-producing apparatus according to an embodiment of this invention.

FIG.1 schematically illustrates the ion-producing apparatus according to an embodiment of the present invention. As is shown in this figure, the apparatus comprises elongated sealed envelope 10. Within this envelope 10, electron-producing vessel 11 and ion-producing vessel 12 are provided side by side, on the axis of envelope 10. Both vessels 11 and 12 are made of electrically conductive material, in the form of hollow cylinders. An electron-producing chamber is provided within vessel 11, and an ion-producing chamber is provided within vessel 12. The ends of electron-producing vessel 11 are covered with wall 11*a* and anode 14, respectively. Wall 11*a* has center hole. Hollow cylindrical cathode 13 extends through this center hole into vessel 11. Hollow cylindrical insulator 9 having a relatively large wall-thickness is interposed between the periphery of the center hole and the outer periphery of cathode 13. Insulator 9, therefore, prevents an electrical charge from leaking through between wall 11*a* and cathode 13. Anode 14 is a thin plate having a number of through holes. Partition 15 made of electrically conductive material is provided within vessel 11, between cathode 13 and anode 14, thus dividing the electron-producing chamber into cathode-side chamber 16 and anode-side chamber 17. Partition 15 has a circular center hole 15*a* communicating chambers 16 and 17 and aligned with cathode 13. The diameter of hole 15*a* is such that it creates a resistance to the flow of gas between chambers 16 and 17, thereby maintaining a predetermined difference in pressure between chamber 16 and chamber 17. The shape of hole 15*a* is not limited to a circular one. Hole 15*a* may be replaced by a slit. The inner periphery of that half portion of hole 15*a*, on the side of anode 14, is covered by insulative layer 18 made of, for example, alumina-based ceramics. Due to insulative layer 18, partition 15 makes no hindrance to the electrical discharge which will be achieved between cathode 13 and anode 14. Since only one partition is provided within electron-producing vessel 11, vessel 11 is relatively short.

Ion-producing vessel 12 comprises rear half 12*a* and front half 12*b* which are electrically isolated from each other. Front half 12*b* is a hollow cylinder open at both ends. Thin plate-like accelerating electrode 19 is provided within front half 12*b*, in a face-to-face relationship with anode 14, with a narrow gap of 0.5 to 1.5 mm provided between it and anode 14. Accelerating electrode 19 divides the inside of vessels 11, 12 into the electron-producing chamber and the ion-producing chamber. Accelerating electrode 19 has a number of through-holes and is electrically connected to front half 12*a* and electrically insulated from anode 14. Both vessels 11, 12 are air-tightly fixed at their open ends. Rear half 12*a* of vessel 12 is a hollow cylinder open at one end to front half 12*b*, and closed at the other end, and constitutes a first ion-extracting electrode. The wall closing the second end of rear half 12*a* has through-hole 20 at its center portion. Through-hole 20 is a slit which is, for example, 1.5 mm wide and 15.5 mm long. This slit communicates with sealed envelope 10, and ions can be introduced from ion-producing vessel 12 into envelope 10 through through-hole 20.

Outside ion-producing vessel 12 and within sealed envelope 10, second ion-extracting electrode 21 and sample-holding electrode 22 are provided, both in axial alignment with ion-producing vessel 12. Second ion-extracting electrode 21 has a through-hole cut in its center portion. The hole of electrode 21 is elliptical and has a minor axis of 5 mm and a major axis of 20 mm. Sample-holding electrode 22 is designed to hold a sample such as a semiconductor substrate, and is located such that the sample held by it faces second ion-extracting electrode 21 and is spaced therefrom at a prescribed distance.

Gas-supply pipe 23 extends into envelope 10 through the hole cut in one end of envelope 10. The inner end of this pipe 23 is coupled to cathode 13, thereby to hupply an inert gas, such as argon gas, through cathode 13 into electron-producing vessel 11. Evacuation pipe 25 is connected to the other end of envelope 10, i.e., the downstream end of envelope 10. This pipe 25 is coupled to vacuum pump 24 provided outside sealed envelope 10. When vacuum pump 24 is driven, gas is pumped out of envelope 10 through evacuation pipe 25, whereby the pressure within envelope 10 is reduced. As a result, gas is evacuated from ion-producing vessel 12, through-hole 20, whereby the pressure within vessel 12 decreases. Further, gas is evacuated from electron-producing vessel 11 via the through-holes in anode 14 and accelerating electrode 19. Since hole 15*a* cut in partition 15 is narrow, the evacuation of cathode-side chamber 16 is suppressed to some degree. The pressure within cathode-side chamber 16 therefore remains higher than that within anode-side chamber 17. For example, the gas pressure within chamber 16 is set at 0.3 to 2.0 Torr, preferably 0.8 Torr, whereas the gas pressure within chamber 17 is set at 0.01 to 0.04 Torr. As can be understood from FIG. 1, the pressures within electron-producing vessel 11 and ion-producing vessel 12 are reduced by evacuating gas from vessels 11 and 12 through only through-hole 20 of rear half 12*a* (i.e., the first ion-extracting electrode) provided downstream of the passage of the electrons produced in vessel 11 and the ions produced in vessel 12. Dopant gas-supply pipe 26, which extends into envelope 10 through a hole cut in the end of envelope 10, is connected to ion-producing vessel 12. The dopant gas supplied through pipe 26 into vessel 12 will be ionized.

As is shown in FIG. 1, the ion-producing apparatus further comprises first power supply 31, second power supply 32, and third power supply 33, each provided outside sealed envelope 10. First power supply 31 is electrically connected among cathode 13, partition 15, and anode 14 thereby to provide a difference in potential of, for example, 500 V, between cathode 13 and anode 14. Second power supply 32 is electrically coupled between anode 14 and accelerating electrode 19, thereby to provide a predetermined difference in potential between electrodes 14 and 19. Third power supply 32 is electrically coupled to anode 14 and electrode 22, thereby to provide a prescribed difference in potential between these electrodes. Power supply 31 applies a discharge voltage high enough to cause an electrical discharge between cathode 13 and anode 14, thereby to produce plasma of the inert gas present between cathode 13 and anode 14. This discharge voltage ranges, for instance, for 100 V to 250 V. Partition 15 functions as an intermediate electrode during the electrical discharge. More specifically, switch 34 coupled between partition 15 and first power supply 31 is closed, thus causing an electrical discharge between cathode 13 and partition 15. When this electrical discharge becomes stable, about two to three minutes from the closing of switch 34, switch 34 is opened, thereby causing an electrical discharge between cathode 13 and anode 14. The use of partition as the intermediate electrode makes it possible to set the discharge initiation voltage at a low level. The voltage applied by second power supply 32 is such that a relatively low potential of, for example, 150 V. Acceleration electrode 19 accelerates the electrons produced in vessel 11, thus imparting a comparatively low energy of, for example, 50 eV to 300 eV to the electrons. The electrons, thus accelerated, rushes into ion-producing vessel 12 and collide with the molecules of the dopant gas supplied to vessel 12 through gas-supply pipe 26. As a result, cations and electrons are produced in vessel 12. The cations are accelerated and emitted through ion-extracting electrodes 20 and 21, from vessel 12 to sample-holding electrode 22. Hence, the cations impinge upon the sample held by electrode 22.

Figure 2:
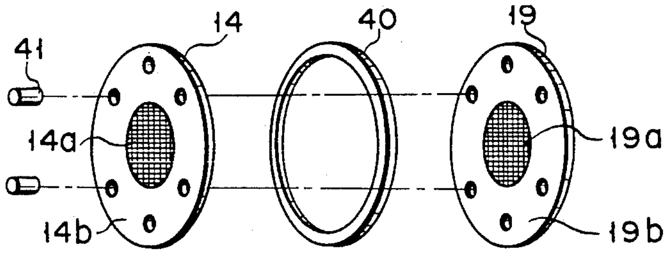
FIG. 2 is a perspective, exploded view of an anode-/accelerating electrode assembly which can be used in the apparatus of FIG. 1.

FIG. 2 shows an assembly comprising anode 14 and accelerating electrode 19, which may be used in place of anode 14 and accelerating electrode 19 both shown in FIG. 1. Electrodes 14 and 19 are discs having the same diameter (several centimeters) and the same thickness (0.2 to 0.5 mm). Anode 14 consists of center portion 14*a* and peripheral portion 14*b*. Similarly, accelerating electrode 19 consists of center portion 19*a* and peripheral portion 19*b*. Electrodes 14 and 19 are both made of a metal having a high melting point, such as molybdenum or tungsten. Center portions 14*a* and 19*a* have a number of through-holes, through which electrons can pass. These through-holes have a diameter of 0.65 mm or less, preferably 0.5 to 0.6 mm, and are arranged at a pitch of 0.7 to 1.0 mm. In order to produce ions with a high efficiency in ion-producing vessel 12, it is necessary to supply as many electrons as possible from electron-producing vessel 11 into ion-producing vessel 12. Hence, the larger the holes, and the shorter the pitch, the better, with respect to the electron flow rate. However, when the diameter of the through-holes is not less than twice the thickness of the sheath of plasma produced in each hole, the plasma leaks an electron accelerating region between anode 14 and accelerating electrode 19, inevitably causing an electrical discharge between cathode 13 and accelerating electrode 19, whereby the electron beams cannot be supplied into ion-producing vessel 12. This is the reason why the diameter of the holes is 0.65 mm or less.

Figure 3:
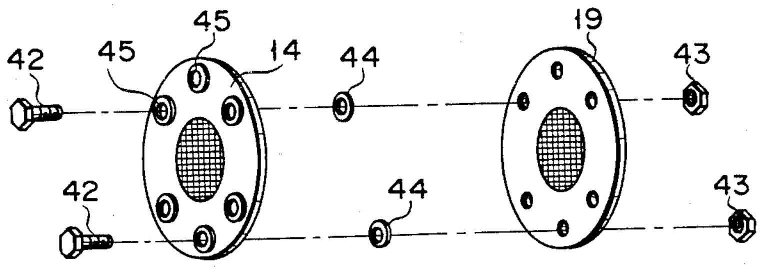
FIG. 3 is a perspective, exploded view of another anode/accelerating electrode assembly which can be used in the apparatus of FIG. 1.

A plurality of openings are formed in the peripheral portion 14*b* of anode 14, and equally spaced in the circumferential direction of anode 14. The same number of openings are formed in the peripheral portion 19*b* of accelerating electrode 19, and equally spaced in the circumferential direction of electrode 19. Annular spacer 40 is interposed between anode 14 and accelerating electrode 19. Spacer 40 has the same outer diameter as electrodes 14 and 19, and has an inner diameter larger than that of the circle in which the openings are arranged. The thickness of spacer 40, which determines the gap between electrodes 14 and 19, is set at 0.5 to 1.5 mm. Fastening pins 41 are inserted in the openings cut in peripheral portions 14*b* and 19*b* of electrodes 14 and 19, thereby fastening electrodes 14 and 19 and spacer 40 together, such that electrodes 14 and 19 are spaced apart from each other by a distance equal to the thickness of spacer 40. Spacer 40 and pins 41 are made of an electrically insulative material such as alumina-based ceramics. Instead of fastening pins 41, bolts 42 and nuts 43 can be used to fasten together electrodes 14 and 19 and spacer 40, as is illustrated in FIG. 3. In the assembly of FIG. 3, small disc-shaped spacers 44 are used in the same number as bolts 42, and other spacers 45 should preferably be interposed between anode 14, on the one hand, and the heads of bolts 42, on the other to prevent two electrodes to electrically contact each other.

In the two assemblies shown in FIGS. 2 and 3, the spacer means can provide an accurate gap between anode 14 and accelerating electrode 19. Either assembly can easily be attached to electron-producing vessel 11 and also to ion-producing vessel 12. Therefore, the ion-producing apparatus can be assembled quite easily.

Figure 4:
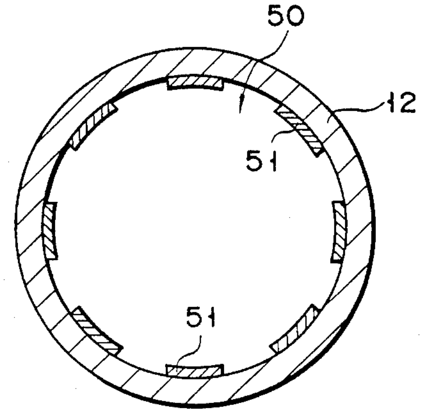
FIG. 4 is a cross-sectional view illustrating an ion-producing vessel and the magnetic field-producing means provided within this vessel.

As is shown in FIG. 1, magnetic field-producing means 50 is provided within ion-producing vessel 12. As is illustrated in FIG. 4, field-producing means 50 is comprised of a number of permanent magnets 51 provided on the inner periphery of vessel 12 and spaced at predetermined intervals in the circumferential direction thereof. Magnets 51 are arranged such that the S pole of any magnet faces the N pole of the next magnet. Alternately, magnets 51 may be so arranged that the adjacent ones have inner faces of different polarities. Hence, the magnetic flux produced by permanent magnets 51 extends along the inner periphery of ion-producing vessel 12, whereby the ions produced in this vessel 12 are repelled away from the inner periphery of vessel 12. In other words, magnets 51 produce a magnetic field which shuts up ions within vessel 12. The magnetic field-producing means may be provided outside ion-producing vessel 12, and may be comprised of electromagnets.

The magnetic field producing means may be constructed by the other element such as an air core coil extending in an axial direction of the vessel 12.

In the embodiment described above, a prescribed difference in potential is not provided between first ion-extracting electrode 12*a* and accelerating electrode 19. Nonetheless, electrodes 12*a* and 19 can be set at the different potentials. Further, first ion-extracting electrode 12*a* can be set at the same potential as anode 14.

In addition, a piece of mesh can be provided in front of anode 14 and can be maintained at a floating potential. This mesh helps to accelerate electrons more stably.

Moreover, cathode 13, which is a hollow cylinder, can be replaced by an ordinary, filament-type cathode. When a filament-type cathode is used, the discharge-starting voltage can be lowered. Even the filament-type cathode is able last for a relatively long period of time since, the gas pressure within cathode-side chamber 16 is high. When cathode 13 is made of $LaB_6$, it can have a longer lifetime.

The ion-producing apparatus of this invention requires no high-powered evacuation means. The electron-producing vessel incorporated in it is short and compact. In addition, the gap between the anode and the accelerating electrode is extremely narrow. Thus, the apparatus is small and simple in structure, and yet can emit ions with high efficiency.

The electron-producing vessel may be constructed by two conductive cylinders which are separated from each other. One cylinder constitutes a cathode side chamber and the other cylinder forms an anode side chamber. A partition wall having a through-hole is made of insulating material and disposed between the cylinders to electrically isolate them. Inside of one and wall of the electron-producing vessel, from which a cathode is projected, is covered with an insulating plate, to prevent an arc discharge between said one end wall and one cylinder.

What is claimed is:

1. An ion-producing apparatus comprising:
an electron-producing vessel having an electron-producing chamber;
an ion-producing vessel having an ion-producing chamber communicating with said electron-producing chamber, and an opening through which ions are emitted from the ion-producing vessel;
a cathode provided at one end of said electron-producing vessel;
an accelerating electrode provided within said ion-producing chamber, for allowing passage of electrons;
an anode provided between said cathode and said accelerating electrode, and opposing said accelerating electrode, for allowing passage of electrons;
means for supplying material to be ionized, to said ion-producing chamber;
a power supply circuit for providing a difference in potential between said cathode and said anode, thereby to produce electrons in the gap between said cathode and said anode;
evacuation means for evacuating gas from said electron-producing chamber and said ion-producing chamber, only through the opening of said ion-producing vessel; and
resistance means provided within said electron-producing vessel, located between said cathode and said anode, dividing said electron-producing vessel into a cathode-side chamber and an anode-side chamber, hindering gas flow from said cathode-side chamber to said anode-side chamber, to create a pressure difference between both chambers, and having electron-passing means for allowing passage of electrons.

2. The ion-producing apparatus according to claim 1, wherein said resistance means has a partition formed with said electron-producing vessel and opposing said anode, and said electron-passing means has a through-hole formed in said partition, communicably connecting said cathode-side chamber to said anode-side chamber.

3. The ion-producing apparatus according to claim 2, wherein said electron-producing vessel is made of electrically conductive material, has a through-hole through which said cathode extends, and further has an insulator provided in said through-hole, thereby functioning as a support for and electrically insulating said cathode from said electron-producing vessel.

4. The ion-producing apparatus according to claim 1, wherein said anode is a thin conductive plate consisting of a center portion having through-holes for allowing passage of electrons, and a peripheral portion, and said accelerating electrode is a thin conductive plate consisting of a center portion having through-holes for allowing passage of electrons, and a peripheral portion, said thin conductive plates being positioned parallel to each other and being spaced apart from each other at a predetermined distance.

5. The ion-producing apparatus according to claim 4, further comprising spacer means interposed between said thin conductive plates and providing a gap therebetween.

6. The ion-producing apparatus according to claim 4, wherein the distance between the anode and accelerating electrode is 0.5 to 1.5 mm.

7. The ion-producing apparatus according to claim 5, further comprising means for fastening together said anode, said accelerating electrode, and said spacer means, said spacer means being interposed between said anode and said accelerating electrode.

8. The ion-producing apparatus according to claim 1, further comprising magnetic field-producing means for producing a magnetic field which prevents ions produced in said ion-producing chamber from impinging upon said ion-producing vessel.

9. The ion-producing apparatus according to claim 8, wherein said magnetic field-producing means has a plurality of magnets arranged, at predetermined intervals, on the inner periphery of said ion-producing vessel such that a magnetic field is generated near the inner periphery of the ion-producing vessel.

10. An ion-producing apparatus comprising:

a vacuum envelope;

support means provided within said vacuum envelope, for supporting a sample;

an electron-producing vessel having an electron-producing chamber;

an ion-producing vessel having an ion-producing chamber communicating with said electron-producing chamber, and an opening through which ions are emitted from the ion-producing vessel to the sample supported by said support means;

a cathode provided at one end of said electron-producing vessel;

an accelerating electrode provided within said ion-producing chamber and having a number of through-holes for allowing passage of electrons;

an anode provided between said cathode and said accelerating electrode, opposing said accelerating electrode, and having a number of through-holes for allowing passage of electrons;

means for supplying material to be ionized, to said ion-producing chamber;

a power supply circuit for providing a difference in potential between said cathode and said anode, thereby to produce electrons in the gap between said cathode and said anode;

evacuation means connected to said vacuum envelope, for evacuating gas from said vacuum envelope, thereby to evacuate gas from said ion-producing vessel, through said opening, and also from said electron-producing vessel, through the through-holes in said anode electrode and accelerating electrode; and a partition provided within said electron-producing chamber, located between said cathode and said anode, dividing said electron-producing vessel into a cathode-side chamber and an anode-side chamber, hindering gas flow from said cathode-side chamber to said anode-side chamber, and having a through-hole for allowing passage of electrons, said cathode-side chamber being defined by said partition and a part of said electron-producing vessel, and said anode-side chamber being defined by said partition, said anode, and another part of said electron-producing vessel.

11. The ion-producing apparatus according to claim 10, wherein said partition is made of electrically conductive material, and has an insulative tubular member inserted in that portion of said through-hole which is close to said anode.

12. An ion-producing apparatus comprising:

an electron-producing vessel having an electron-producing chamber;

an ion-producing vessel having an ion-producing chamber communicating with said electron-producing chamber, and an opening through which ions are emitted from the ion-producing vessel;

a cathode provided at one end of said electron-producing vessel;

an accelerating electrode provided within said ion-producing chamber, for allowing passage of electron beams;

an anode provided between said cathode and said accelerating electrode, and opposing said accelerating electrode, for allowing passage of electrons;

means for supplying material to be ionized, to said ion-producing chamber;

evacuating means for evacuating gas from said electron-producing chamber and said ion-producing chamber, only through the opening of said ion-producing vessel;

an intermediate electrode provided within said electron-producing chamber, located between said cathode and said anode, dividing said electron-producing vessel into a cathode-side chamber and an anode-side chamber, hindering gas flow from said cathode-side chamber to said anode-side chamber, and having a through-hole for allowing passage of electrons; and a power supply circuit for selectively providing a difference in potential between said cathode and said intermediate electrode, and between said cathode electrode and said anode.

13. The ion-producing apparatus according to claim 12, wherein said power supply circuit has a power supply connected between said cathode and said intermediate electrode, for providing a difference in potential between said cathode and said anode, and a switch connected between said power supply and said intermediate electrode, said switch being closed at the start of the operation of the apparatus and opened upon elapse of a predetermined time thereafter.

* * * * *